US012501195B1

(12) United States Patent
Zhao et al.

(10) Patent No.: US 12,501,195 B1
(45) Date of Patent: Dec. 16, 2025

(54) FLOATING ATOMIZER LIGHT SPEAKER DEVICE

(71) Applicant: SICHUAN COOTWAY TECHNOLOGY CO., LTD., Sichuan (CN)

(72) Inventors: Chunhai Zhao, Sichuan (CN); Daiquan Li, Sichuan (CN); Gangbin Wan, Sichuan (CN)

(73) Assignee: SICHUAN COOTWAY TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 19/320,233

(22) Filed: Sep. 5, 2025

(30) Foreign Application Priority Data

Aug. 21, 2025 (CN) ......................... 202521785427.7

(51) Int. Cl.

| | |
|---|---|
| ***H04R 1/02*** | (2006.01) |
| ***B05B 15/60*** | (2018.01) |
| ***B63B 22/24*** | (2006.01) |
| ***F21V 33/00*** | (2006.01) |
| ***H04R 3/00*** | (2006.01) |

(52) U.S. Cl.
CPC ............. *H04R 1/028* (2013.01); *B05B 15/60* (2018.02); *B63B 22/24* (2013.01); *F21V 33/0056* (2013.01); *H04R 1/023* (2013.01); *H04R 1/025* (2013.01); *H04R 3/00* (2013.01); *B63B 2201/08* (2013.01); *B63B 2203/00* (2013.01); *H04R 2420/07* (2013.01)

(58) Field of Classification Search
CPC ........ H04R 1/028; H04R 1/023; H04R 1/025; H04R 3/00; H04R 2420/07; B05B 15/60; B63B 22/24; B63B 2201/08; B63B 2203/00; F21V 33/0056
See application file for complete search history.

(56) References Cited

U.S. PATENT DOCUMENTS

2002/0179728 A1* 12/2002 Beidokhti ............... B05B 17/08 239/20
2004/0092181 A1* 5/2004 Porat ....................... B63B 22/24 441/136

(Continued)

*Primary Examiner* — Bao Q Truong
(74) *Attorney, Agent, or Firm* — Law Offices of Sandy Lipkin; Sandy Lipkin

(57) ABSTRACT

The present application provides a floating atomizer light speaker device, which includes: a housing configured to float on a water surface and including a spray nozzle oriented upward; an atomization assembly disposed within the housing and configured to convert liquid into mist, which is discharged through the spray nozzle; a sound-producing device disposed within the housing and configured to play audio; a power supply system disposed within the housing for supplying power to the atomization assembly and the sound-producing device; and a control circuit board electrically connected to the power supply system and the sound-producing device, wherein the control circuit board includes a wireless communication module, the control circuit board is configured to receive wireless signals via the wireless communication module and control the sound-producing device to play audio based on the received wireless signals.

20 Claims, 11 Drawing Sheets

(56) References Cited

U.S. PATENT DOCUMENTS

| | | | | |
|---|---|---|---|---|
| 2014/0369542 | A1* | 12/2014 | Lee | H04R 1/44<br>381/334 |
| 2016/0157002 | A1* | 6/2016 | Chen | H02N 15/00<br>320/108 |
| 2016/0286308 | A1* | 9/2016 | Chen | H04R 1/02 |

* cited by examiner

FLOATING ATOMIZER LIGHT SPEAKER DEVICE

CROSS-REFERENCE TO RELATED APPLICATIONS

The present application claims priority of Chinese patent application CN 2025217854277, filed on Aug. 21, 2025, which is incorporated herein by reference in its entirety.

TECHNICAL FIELD

The present application relates to the field of atomization devices, and more particularly to a floating atomizer light speaker device.

BACKGROUND ART

In recent years, floating atomizer light speaker devices have gained popularity due to their characteristics of environmental friendliness and convenience. However, most commercially available floating atomizer light speaker devices currently on the market only offer misting functionality. They lack wireless music playback capabilities, lighting effects, and memory storage functions. Consequently, users need to reconfigure the settings after each power cycle, which is inconvenient. To address these issues, the present application provides a floating atomizer light speaker device that can effectively solve the aforementioned problems.

SUMMARY

In order to overcome the deficiencies of the prior art, the present application provides a floating atomizer light speaker device comprising: a housing configured to float on a water surface and comprising a spray nozzle oriented upward; an atomization assembly disposed in the housing and configured to convert liquid into mist, wherein the mist discharges through the spray nozzle; a sound-producing device disposed in the housing and configured to play audio; a power supply system disposed in the housing and electrically connected to the atomization assembly and the sound-producing device to supply power to the atomization assembly and the sound-producing device; and a control circuit board electrically connected to the power supply system and the sound-producing device, wherein the control circuit board comprises a wireless communication module, and the control circuit board is configured to receive wireless signals via the wireless communication module and control the sound-producing device to play audio based on received wireless signals.

Furthermore, the housing comprises an upper shell, a middle shell, and a lower shell, wherein the lower shell is configured to float on water, and the upper shell, the middle shell, and the lower shell are connected sequentially.

Furthermore, the middle shell and the lower shell are connected to form a first accommodation chamber, the bottom of the lower shell comprises a plurality of first water inlets, the first water inlets are in communication with the first accommodation chamber, and the first water inlets are configured to allow water to flow into the first accommodation chamber.

Furthermore, the floating atomizer light speaker device further comprises an inner shell disposed between the upper shell and the middle shell, wherein the inner shell and the middle shell are connected to form a second accommodation chamber; and the atomization assembly, the sound-producing device, and the power supply system are disposed in the second accommodation chamber.

Furthermore, the inner shell further comprises a first clamping groove, and the middle shell comprises a first connection part, the first connection part is configured to engage with the first clamping groove to connect the inner shell with the middle shell to form the second accommodation chamber.

Furthermore, a first sealing member is disposed in the first clamping groove, and the first connection part is configured to engage with the first clamping groove and compress the first sealing member to enhance the sealing of the second accommodation chamber.

Furthermore, the inner shell comprises an atomization channel, the atomization assembly is disposed in the atomization channel, the middle shell comprises a fixing groove, one end of the atomization channel is inserted in the fixing groove to fixedly connect the atomization channel and the middle shell; a second sealing member is disposed in the fixing groove, and one end of the atomization channel is inserted in the fixing groove and compresses the second sealing member to enhance the sealing of the second accommodation chamber.

Furthermore, the atomization channel comprises a transverse plate, the transverse plate comprises a first mounting hole, and the atomization assembly is inserted in the first mounting hole to fixedly connect the atomization assembly (2) and the middle shell.

Furthermore, the inner shell further comprises an atomization chamber, one end of the atomization assembly is disposed in the atomization chamber, the transverse plate further comprises a second water inlet, the second water inlet is in communication with the atomization chamber, and the second water inlet is configured to allow water to enter the atomization chamber for atomization by the atomization assembly (2) into a mist state.

Furthermore, the floating atomizer light speaker device further comprises a fan electrically connected to the power supply system, wherein a fan housing is disposed in the atomization chamber, the fan housing is connected to the inner shell, and the fan is disposed in the fan housing.

Furthermore, the spray nozzle is in communication with the atomization chamber, the fan housing comprises an air outlet, and the air outlet is inclined toward the inner wall of the atomization chamber to make wind driven by the fan generate a flowing airflow in the atomization chamber to drive mist discharge through the spray nozzle quickly.

Furthermore, the fan housing further comprises a first air inlet, the upper shell comprises a second air inlet, and the second air inlet is positioned corresponding to and in communication with the first air inlet to allow air to enter the fan housing.

Furthermore, the inner shell comprises a second mounting hole, the sound-producing device is disposed in the second mounting hole, and the second mounting hole is configured to allow sound from the sound-producing device to diffuse outward.

Furthermore, a baffle is disposed on the inner wall of the upper shell, a fastener is disposed on the inner wall of the atomization chamber, and the baffle is configured to engage with the fastener to abut against the inner wall of the atomization chamber, thereby preventing mist in the atomization chamber from diffusing toward the sound-producing device.

Furthermore, a second clamping groove is disposed around the periphery of the second mounting hole, the sound-producing device comprises a second connection part, and the second connection part is configured to engage with the second clamping groove to fixedly connect the sound-producing device and the second mounting hole.

Furthermore, the upper shell further comprises a plurality of sound holes, and the sound holes are positioned corresponding to the sound-producing device to protect the sound-producing device.

Furthermore, the power supply system comprises a battery, a charging port, and a control button, the middle shell comprises a mounting groove, the battery is disposed in the mounting groove, the battery, the charging port, and the control button are electrically connected to the control circuit board, the control button is disposed on the housing to control the floating atomizer light speaker device, and the charging port is configured to charge the battery; the floating atomizer light speaker device further comprises a waterproof plug covering the charging port to enhance sealing of the charging port.

Furthermore, the floating atomizer light speaker device further comprises a first light-emitting assembly disposed in the second accommodation chamber, wherein the first light-emitting assembly is oriented downward and connected to the middle shell; the middle shell further comprises a plurality of first light-transmitting parts, the light-emitting position of the first light-emitting assembly corresponds to the positions of the first light-transmitting parts, the lower shell is made of transparent material, and light from the first light-emitting assembly is projected into water through the first light-transmitting parts and the lower shell.

Furthermore, the floating atomizer light speaker device further comprises a second light-emitting assembly disposed in the atomization chamber and corresponding to the position of the spray nozzle, wherein the second light-emitting assembly is oriented upward, the floating atomizer light speaker device further comprises a second light-transmitting part covering the second light-emitting assembly.

Furthermore, the control circuit board comprises a storage module, and the storage module is configured to store settings of the floating atomizer light speaker device before shutdown.

The beneficial effects of the present application are as follows: the present application provides a floating atomizer light speaker device that can float on water and convert water into mist discharged from the spray nozzle to achieve mist spray function, and is equipped with a sound-producing device capable of playing music. Users can control the floating atomizer light speaker device to play music via wireless connection, thereby enhancing the user experience. The floating atomizer light speaker device further has storage and memory functions, which can retain settings before shutdown and resume the previous settings to use upon startup, thereby greatly improving convenience for users.

BRIEF DESCRIPTION OF THE DRAWINGS

In order to describe the technical solutions in the embodiments of the present application more clearly, drawings required to be used in the description of the embodiments will be briefly introduced below. The drawings in the following description are merely some embodiments of the present application. For those of ordinary skill in the art, other drawings may be derived from these drawings on the premise of paying no creative effort.

The present application will now be further described below in conjunction with the accompanying drawings and embodiments.

Figure 1:
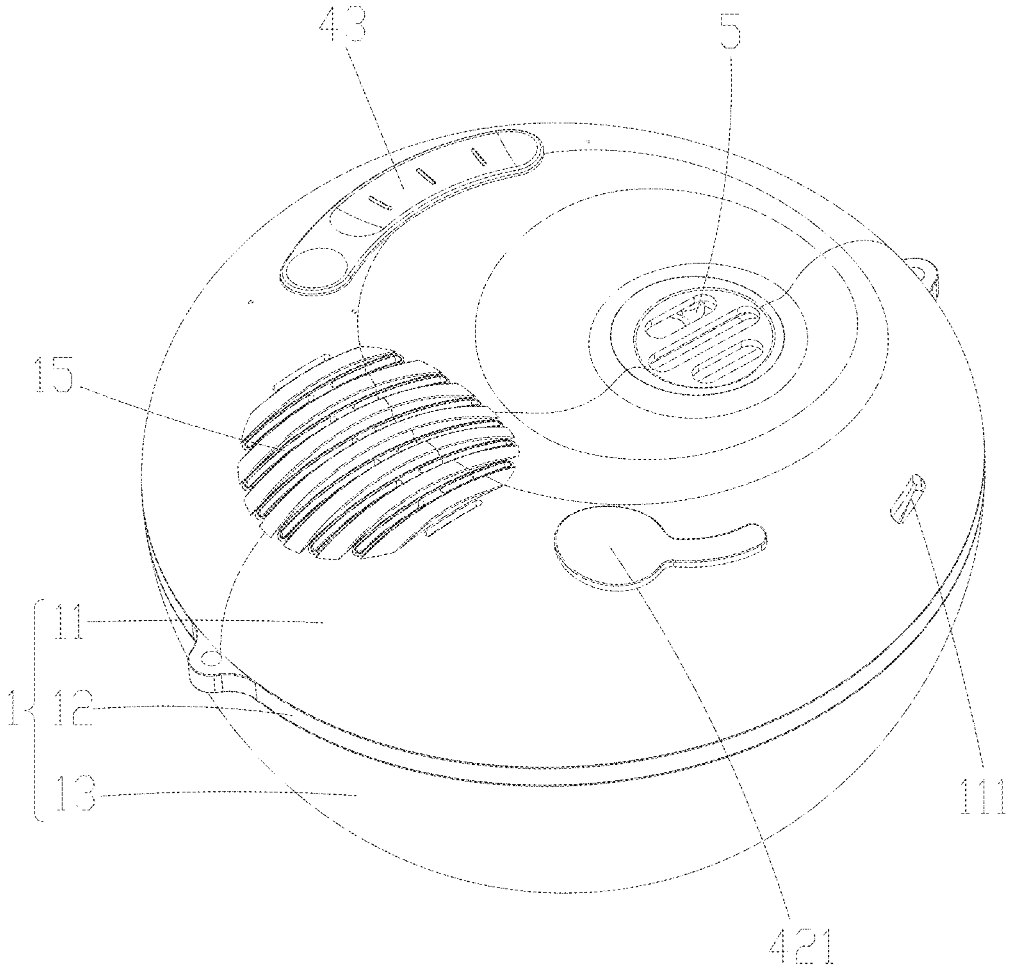
FIG. 1 is a perspective view of Embodiment 1 of the floating atomizer light speaker device of the present application.
Figure 2:
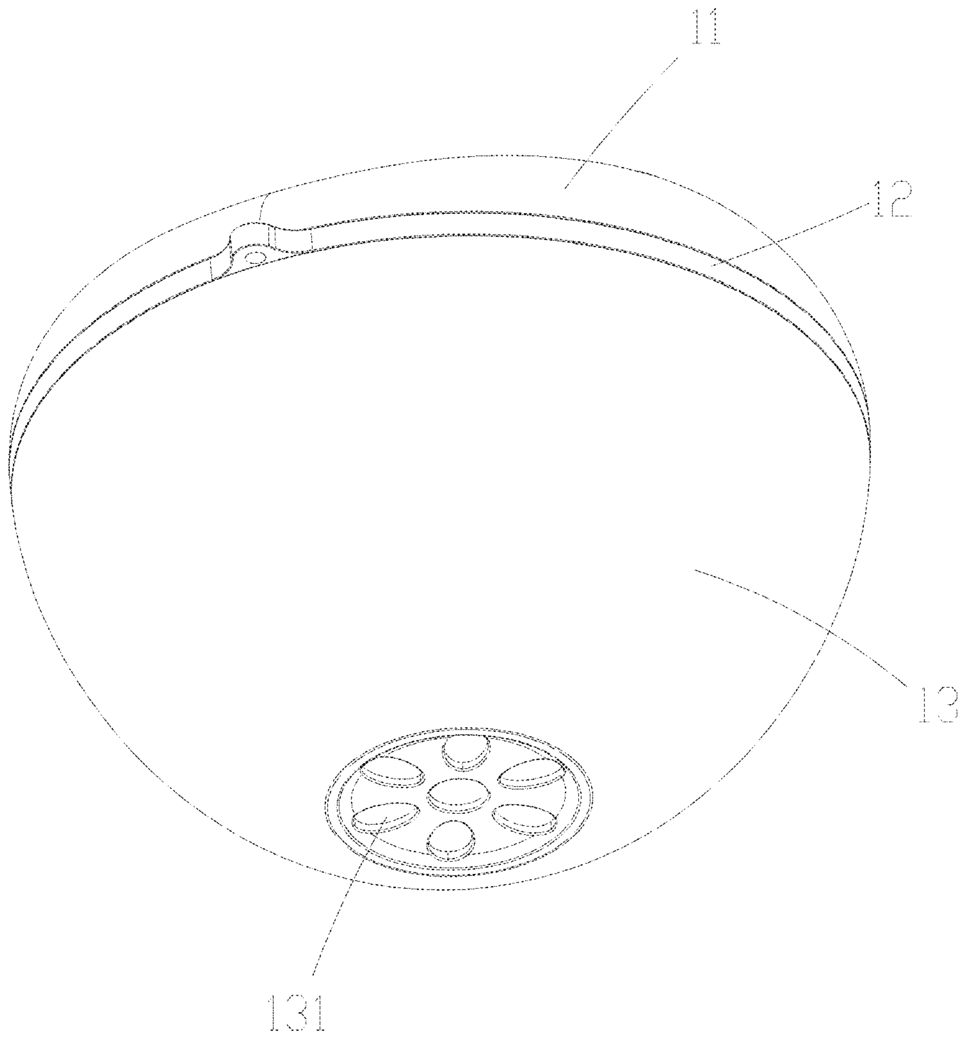
FIG. 2 is another perspective view of Embodiment 1 of the floating atomizer light speaker device of the present application.
Figure 3:
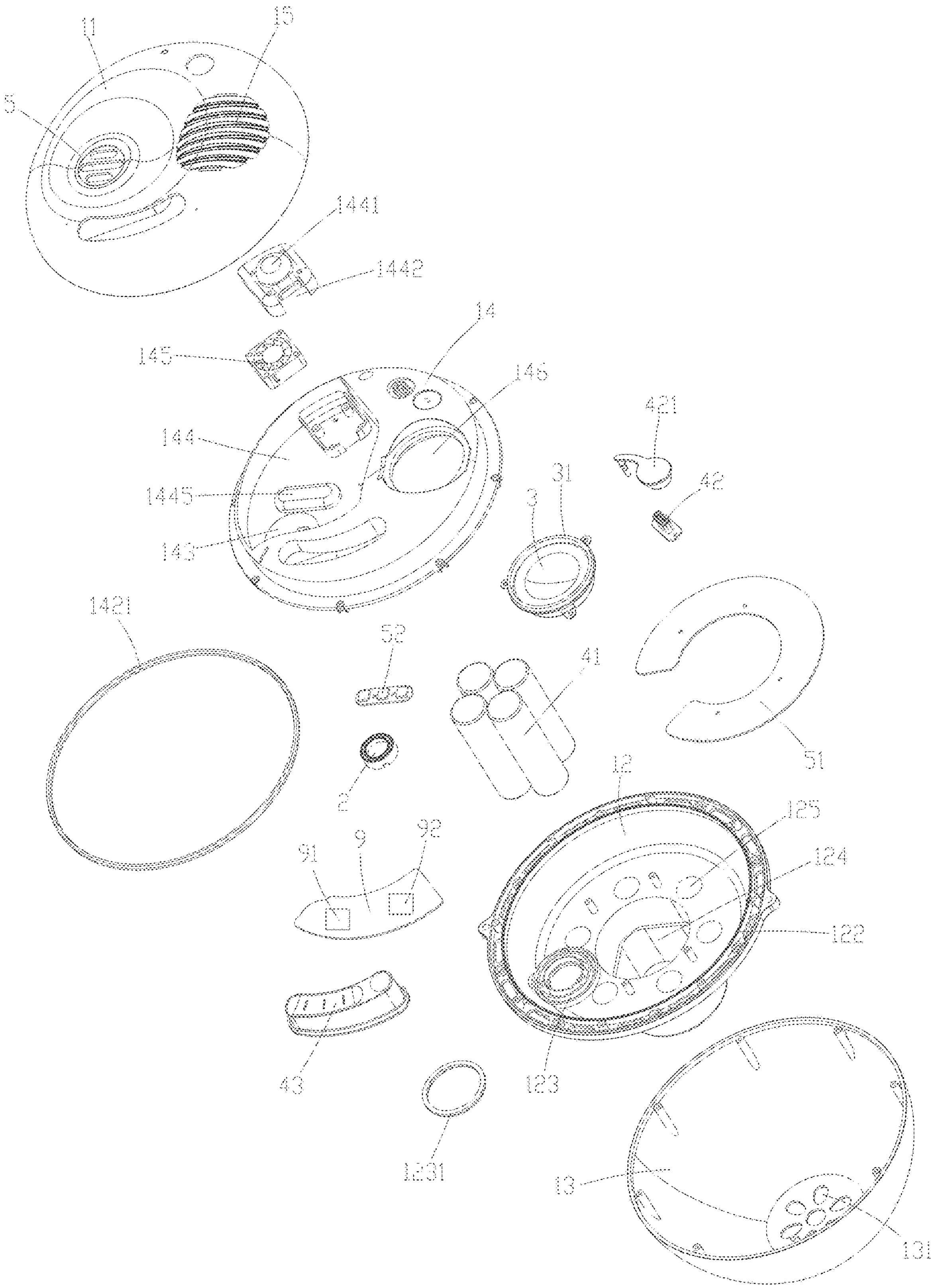
FIG. 3 is an exploded view of Embodiment 1 of the floating atomizer light speaker device of the present application.
Figure 4:
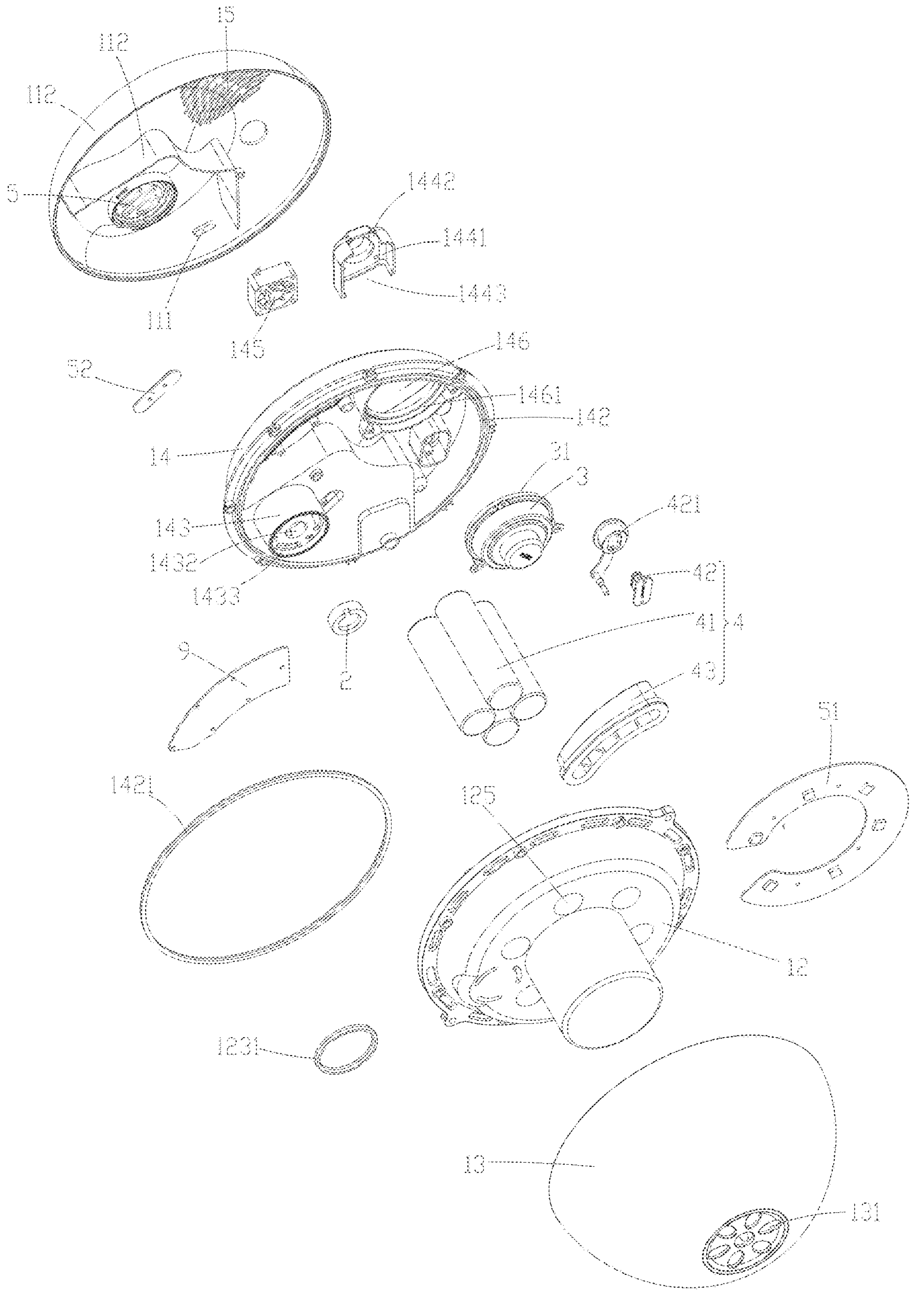
FIG. 4 is another exploded view of Embodiment 1 of the floating atomizer light speaker device of the present application.
Figure 5:
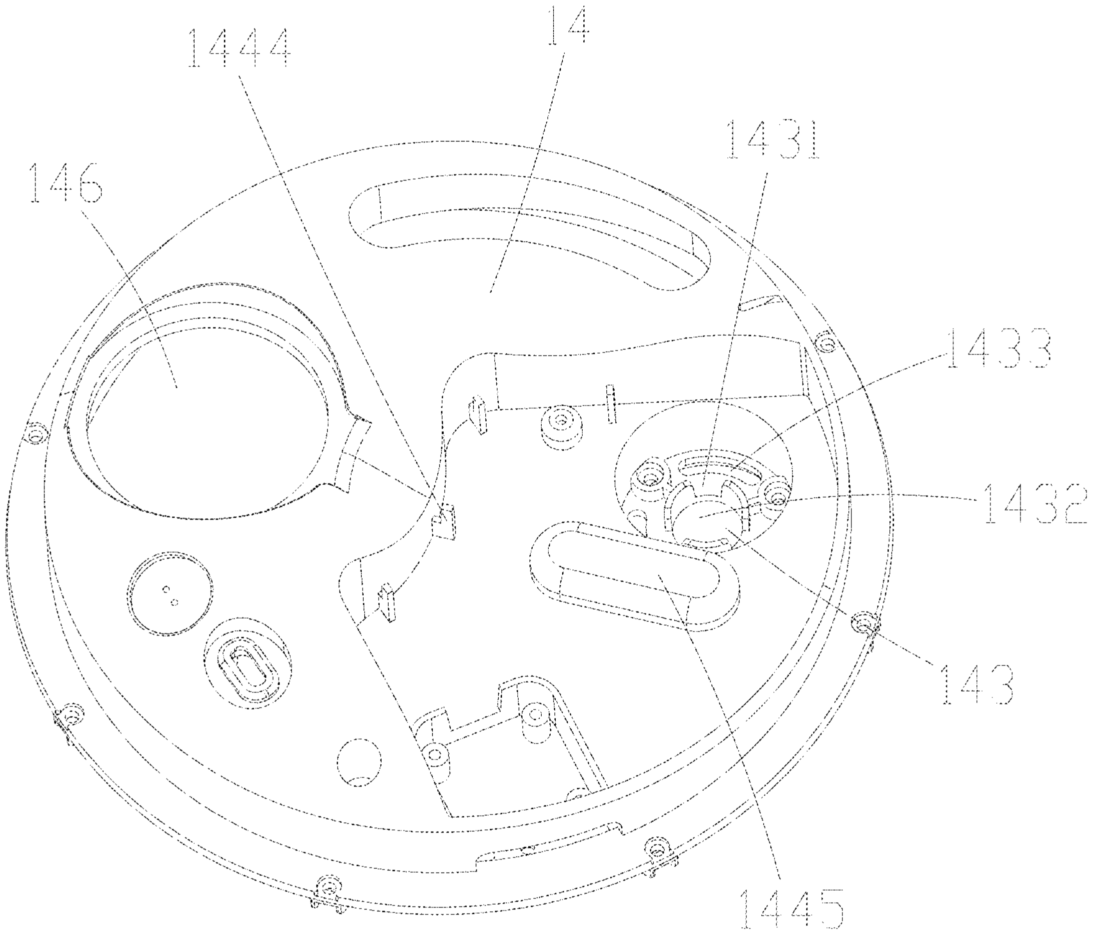
FIG. 5 is a perspective view of an inner shell of Embodiment 1 of the floating atomizer light speaker device of the present application.
Figure 6:
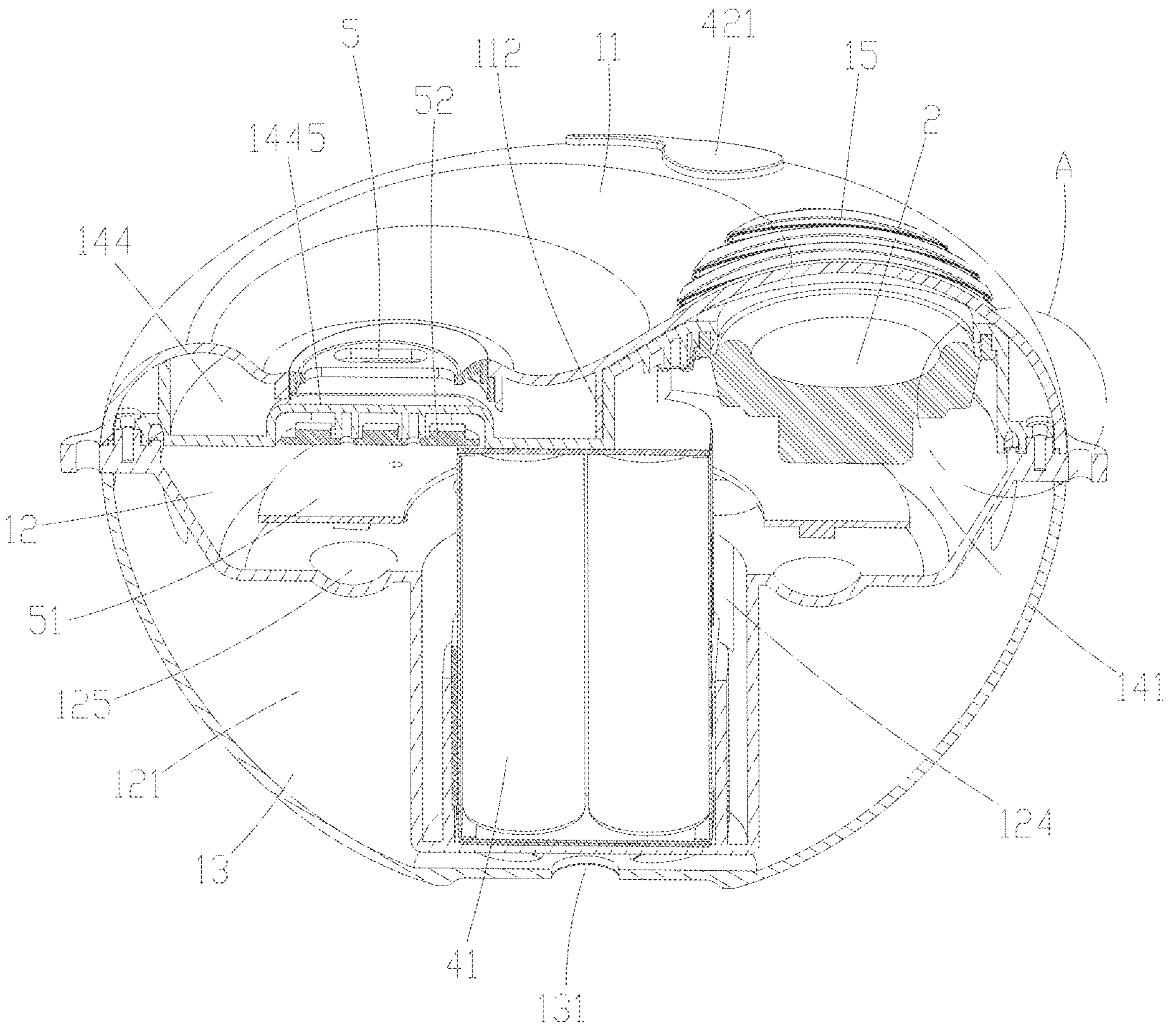
FIG. 6 is a cross-sectional view of Embodiment 1 of the floating atomizer light speaker device of the present application.
Figure 7:
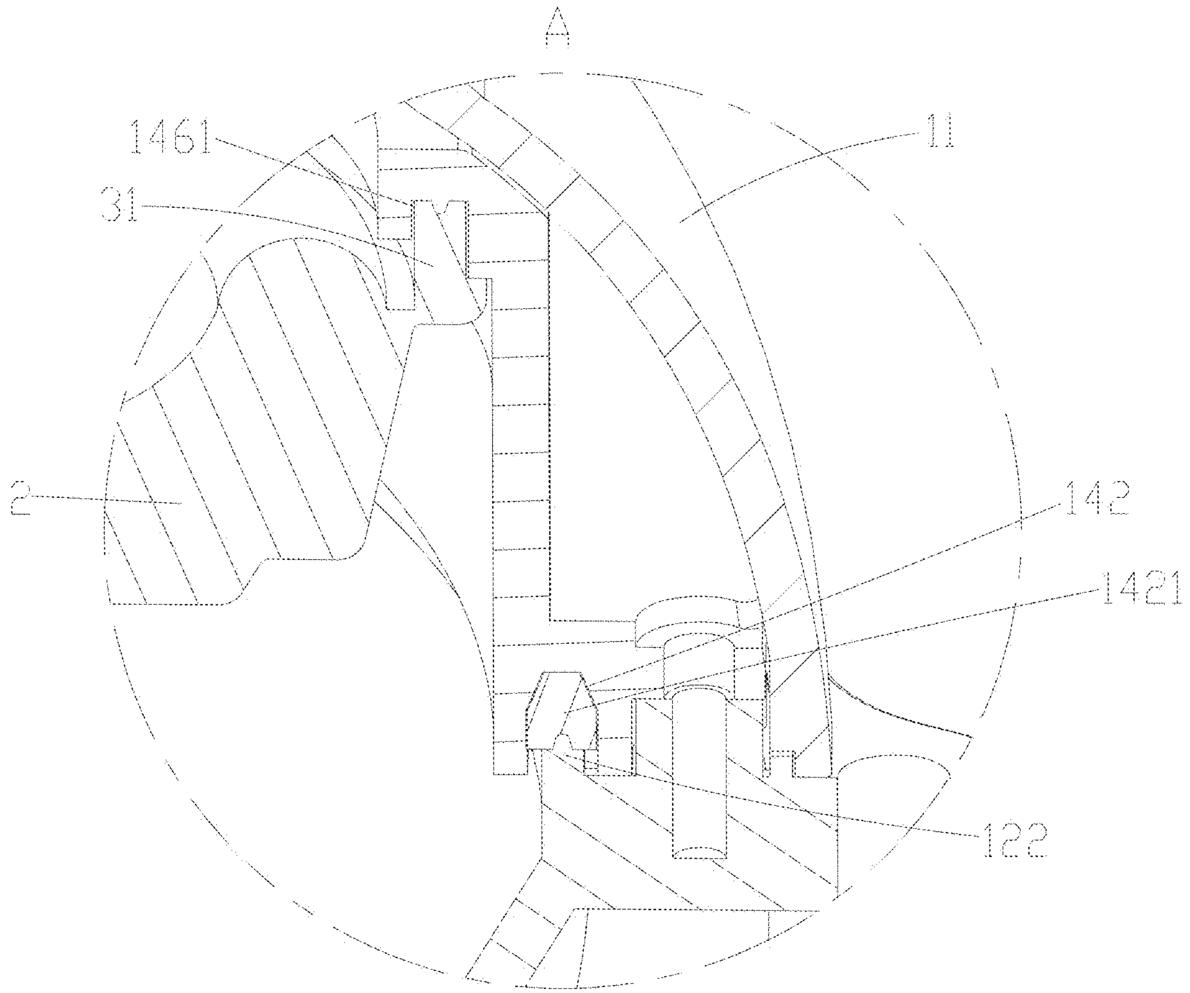
FIG. 7 is an enlarged view of the portion A in FIG. 6.
Figure 8:
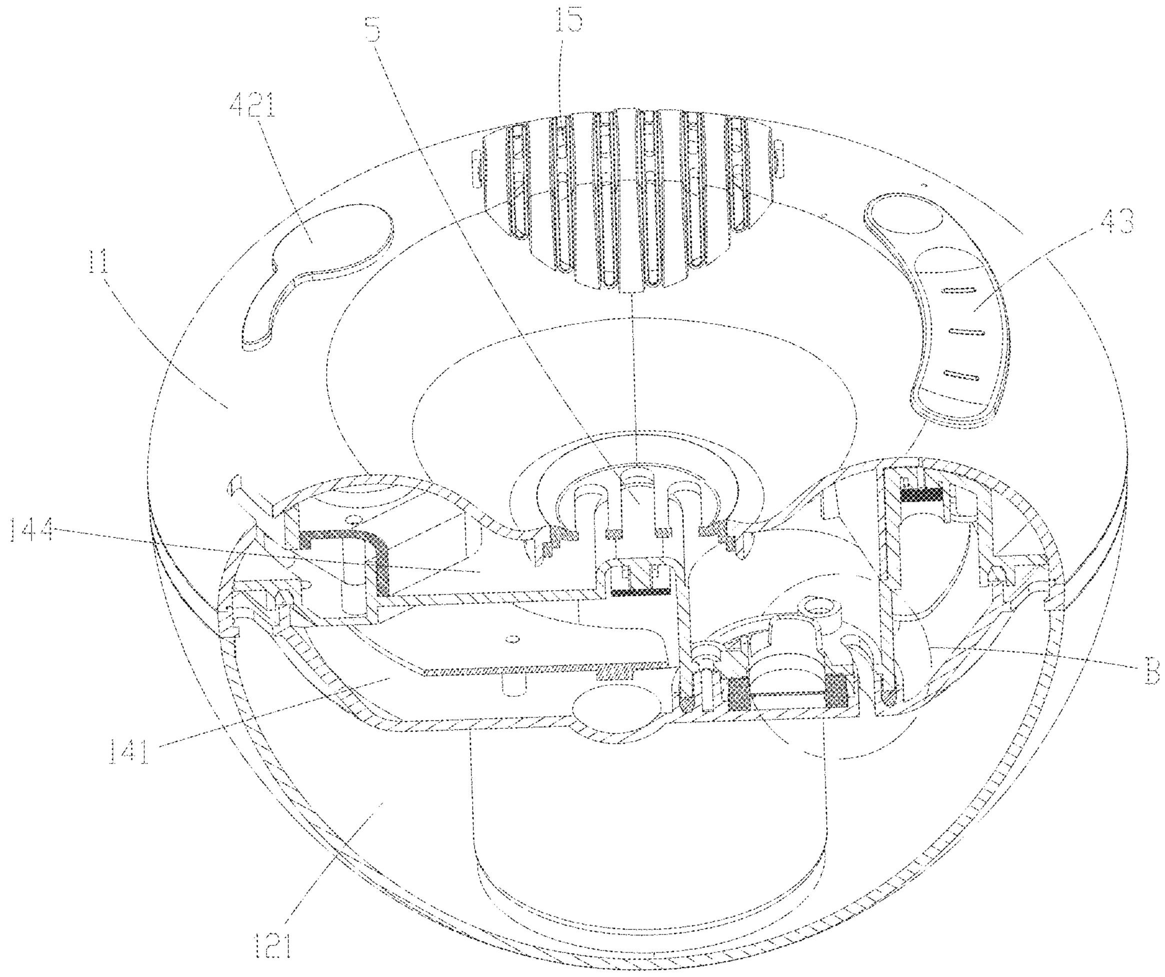
FIG. 8 is another cross-sectional view of Embodiment 1 of the floating atomizer light speaker device of the present application.
Figure 9:
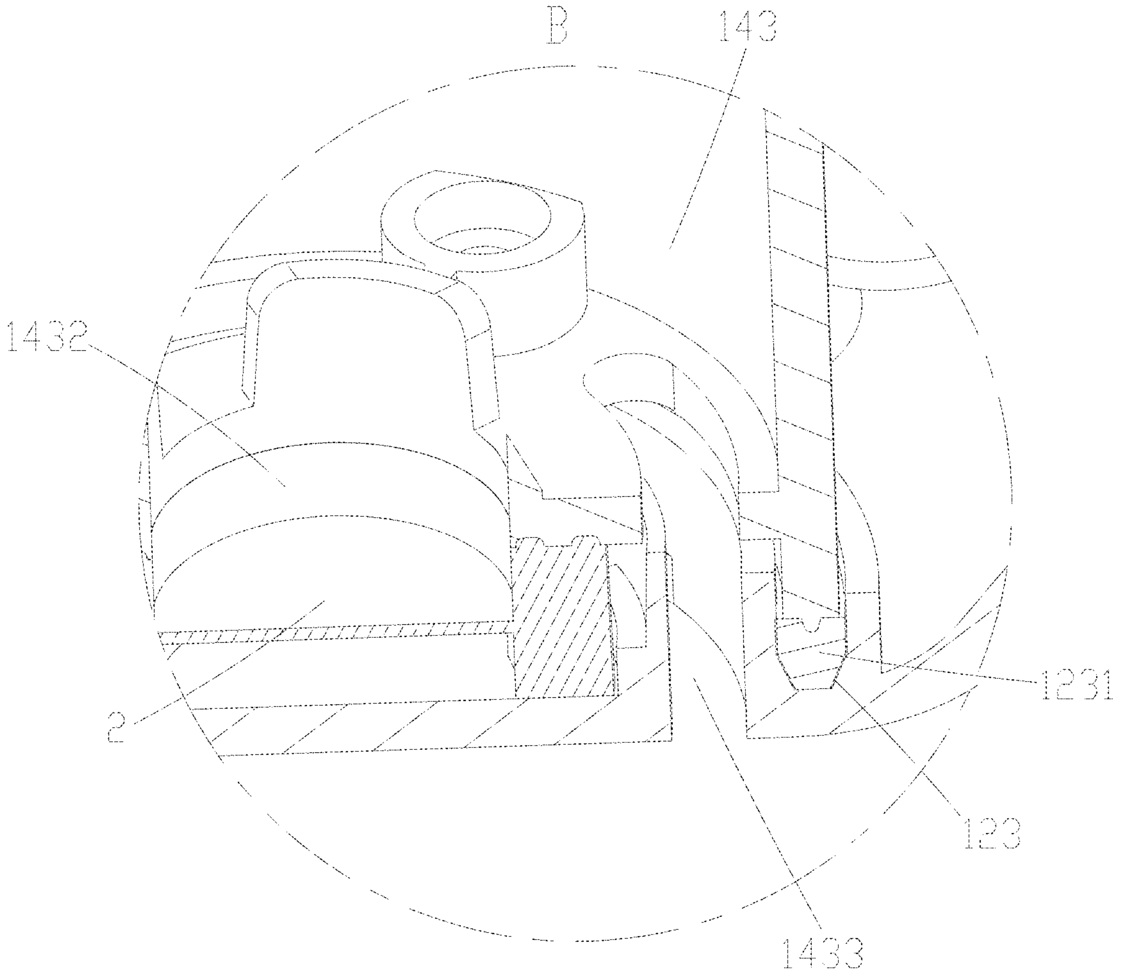
FIG. 9 is an enlarged view of the portion B in FIG. 8.

Reference Numbers: Housing (1); Atomization assembly (2); sound-producing device (3); Power supply system (4); spray nozzle (5); Upper shell (11); Middle shell (12); Lower shell (13); First accommodation chamber (121); First water inlet (131); Inner shell (14); Second accommodation chamber (141); First clamping groove (142); First connection part (122); First sealing member (1421); Atomization channel (143); Atomization chamber (144); Fixing groove (123); Second sealing member (1231); Transverse plate (1431); First mounting hole (1432); Second water inlet (1433); Fan (145); Fan housing (1441); Air outlet (1442); First air inlet (1443); Second air inlet (111); Baffle (112); Sound hole (15); Fastener (1444); Second connection part (31); Second mounting hole (146); Battery (41); Charging port (42); Waterproof plug (421); Control button (43); First light-emitting assembly (51); First light-transmitting part (125); Second light-emitting assembly (52); Second light-transmitting part (1445); Mounting groove (124); Control circuit board (9); Wireless communication module (91); Storage module (92).

DETAILED DESCRIPTION OF THE EMBODIMENTS

The technical solutions in the embodiments of the present application will be described clearly and entirely below in conjunction with the accompany drawings in the embodiments of the present application. It is obvious that the described embodiments are merely some embodiments of the present application, rather than all embodiments. Based on the embodiments of the present application, any other embodiment obtained by those of ordinary skill in the art on the premise of paying no creative effort belongs to the protection scope of the present application.

Embodiment 1

Referring to FIG. 1 to FIG. 9, the present application provides a floating atomizer light speaker device, which includes:

- a housing 1 configured to float on a water surface, wherein the housing 1 includes a spray nozzle 5 oriented upward;
- an atomization assembly 2 disposed within the housing 1 and configured to convert liquid into mist which is discharged through the spray nozzle 5;
- a sound-producing device 3 disposed within the housing 1 and configured to play audio;
- a power supply system 4 disposed within the housing 1 and electrically connected to the atomization assembly 2 and the sound-producing device 3 for supplying power to the atomization assembly 2 and the sound-producing device 3; and
- a control circuit board 9 electrically connected to the power supply system 4 and the sound-producing device 3, wherein the control circuit board 9 includes a wireless communication module 91 for receiving wireless signals, and the control circuit board 9 is configured to control the sound-producing device 3 to play audio based on received wireless signals.

With this structural configuration, the floating atomizer light speaker device provided by the present application includes the housing 1, which enables the floating atomizer light speaker device to float on a water surface and includes the upward-oriented spray nozzle 5. The floating atomizer light speaker device further includes the atomizing device 2, which is located within the housing 1 and used to convert liquid into mist discharged through the spray nozzle 5. The floating atomizer light speaker device further includes the sound-producing device 3, which is configured for playing audio. The floating atomizer light speaker device further includes the power supply system 4 used to supply power to the atomizing device 2 and the sound-producing device 3. The floating atomizer light speaker device further includes the control circuit board 9 electrically connected to the sound-producing device 3, and the control circuit board 9 includes the wireless communication module 91. The wireless communication module 91 is capable of receiving wireless signals. Wireless signals are sent from an external controller or mobile app, and the control circuit board 9 receives the wireless signals via the wireless communication module 91 and then controls the sound-producing device 3 to play audio. Users need not manually operate buttons to control the floating atomizer light speaker device to play music, instead, they can control the floating atomizer light speaker device, by the method of wireless transmission, to play their preferred music. This offers significant convenience for users and enhances the user experience.

In this embodiment, the housing 1 includes an upper shell 11, a middle shell 12, and a lower shell 13. The lower shell 13 is designed to float on water, the upper shell 11, middle shell 12, and lower shell 13 are connected sequentially, and the spray nozzle 5 is arranged on the upper shell 11. When the floating atomizer light speaker device is placed in water, the lower shell 13 floats on the water surface. The middle shell 12 and the lower shell 13 are connected to form a first accommodation chamber 121. The bottom of the lower shell 13 includes multiple first water inlets 131, which are connected to the first accommodation chamber 121. The first water inlets 131 are configured to allow water to flow into the first accommodation chamber 121. With this structural configuration, when the floating atomizer light speaker device is placed in water, water enters the first accommodation chamber 121 through the first water inlets 131 and fills the entire first accommodation chamber 121 for use of subsequent atomization.

In this embodiment, the floating atomizer light speaker device further includes an inner shell 14, which is positioned between the upper shell 11 and the middle shell 12. The inner shell 14 and the middle shell 12 are connected to form a second accommodation chamber 141. The atomization assembly 2, the sound-producing device 3, and the power supply system 4 are all disposed within the second accommodation chamber 141. With this structural configuration, the inner shell 14 is located inside the main housing 1, specifically between the upper shell 11 and the middle shell 12. The connection between the inner shell 14 and the middle shell 12 forms the second accommodation chamber 141, and the atomization assembly 2, the sound-producing device 3, the power supply system 4, and control circuit board 9 are all disposed within the second accommodation chamber 141. Specifically, the inner shell 14 further includes a first clamping groove 142, and the middle shell 12 includes a first connection part 122. The first connection part 122 is configured to engage with the first clamping groove 142, so that the inner shell 14 and the middle shell 12 are connected to form the second accommodation chamber 141. With this structural configuration, the first connection part 122 engages with the first clamping groove 142 142, so that the inner shell 14 and the middle shell 12 are connected more securely, thereby forming the second accommodation chamber 141. Preferably, a first sealing member 1421 is disposed within the first clamping groove 142. The first connection part 122 is configured to engage with the first clamping groove 142 and compress the first sealing member 1421, thereby enhancing sealing of the second accommodation chamber 141. By arranging the first sealing member 1421 in the first clamping groove 142, sealing of the second accommodation chamber 141 is improved.

In this embodiment, the inner shell 14 includes an atomization channel 143. The atomization device 2 is disposed within the atomization channel 143. The middle shell 12 includes a fixing groove 123. One end of the atomization channel 143 is inserted in the fixing groove 123 to securely connect the atomization channel 143 to the middle shell 12. With this structural configuration, the inner shell 14 is provided with the atomization channel 143, which communicates the first accommodation chamber 121 with an atomization chamber 144 (detailed below). The middle shell 12 is provided with the fixing groove 123, and a lower end of the atomization channel 143 is inserted in the fixing groove 123, thereby connecting the atomization channel 143 to the middle shell 12 while further enhancing the stability of the connection between the inner shell 14 and the middle shell 12. Preferably, a second sealing member 1231 is disposed within the fixing groove 123. An end of the atomization channel 143 is inserted in the fixing groove 123 and compresses the second sealing member 1231 to improve the sealing performance of the second accommodation chamber 141.

In this embodiment, the atomization channel 143 includes a transverse plate 1431. The transverse plate 1431 includes a first mounting hole 1432. The atomization assembly 2 is inserted in the first mounting hole 1432 to securely connect the atomization assembly 2 to the middle shell 12. Through the above structural configuration, the transverse plate 1431 is disposed within the atomization channel 143. The first mounting hole 1432 is provided in the center of the transverse plate 1431, and the atomization assembly 2 is precisely inserted in the first mounting hole 1432, making the connection between the atomization assembly 2 and the atomization channel 143 of the middle shell 12 more stable.

In this embodiment, the inner shell 14 further includes an atomization chamber 144. One end of the atomization assembly 2 is disposed within the atomization chamber 144. The horizontal plate 1431 further includes a second water inlet 1433. The second water inlet hole 1433 is connected to the atomization chamber 144 and configured to allow water to enter the atomization chamber 144, thereby enabling the atomization assembly 2 to atomize the water into a mist state. With this structural configuration, the inner shell 14 is provided with the atomization chamber 144, and the transverse plate 1431 is provided with the second water inlet 1433, which communicates the first accommodation chamber 121 with the atomization chamber 144. Water in the first accommodation chamber 121 enters the atomization chamber 144 through the second water inlet 1433 and comes into contact with the atomization assembly 2, and the atomization assembly 2 converts the water into a mist state.

In this embodiment, the floating atomizer light speaker device further includes a fan 145. The fan 145 is electrically connected to the power supply system 4. A fan housing 1441 is disposed within the atomization chamber 144. The fan housing 1441 is connected to the inner shell 14, and the fan 145 is disposed inside the fan housing 1441. With this structural configuration, the power supply system 4 supplies power to the fan 145. The fan housing 1441 is disposed within the atomization chamber 144, and the fan 145 rotates inside the fan housing 1441. Specifically, the fan housing 1441 includes an air outlet 1442. The air outlet 1442 is inclined toward the inner wall of the atomization chamber 144, so that wind blown from the fan 145 generates a flowing airflow in the atomization chamber 144, thereby driving mist to quickly spraying out through the spray nozzle 5. With this structural configuration, the air outlet 1442 of the fan housing 1441 is oriented at an incline toward the inner wall of the atomization chamber 144. The wind blown from the fan 145 strikes the inner wall of the atomization chamber 144 at an inclined angle, generating a high-velocity airflow that flows along the inner wall of the atomization chamber 144. This drives mist to quickly spray out through the spray nozzle 5, resulting in a greater volume of mist being emitted from the spray nozzle 5.

In this embodiment, the fan housing 1441 further includes a first air inlet 1443. The upper shell 11 includes a second air inlet 111. The position of the second air inlet 111 corresponds to that of the first air inlet 1443, allowing air to enter the fan housing 1441. With this structural configuration, the corresponding arrangement of the first air inlet 1443 and the second air inlet 111 enables the first air inlet 1443 to communicate with the second air inlet 111, air can enter the fan housing 1441 through the first air inlet 1443 and the second air inlet 111, thereby providing sufficient air for rotation of the fan 145.

In this embodiment, the inner shell 14 includes a second mounting hole 146. The sound-producing device 3 is disposed within the second mounting hole 146, and the second mounting hole 146 serves to facilitate outward diffusion of sound generated by the sound-producing device 3. With this structural configuration, the second mounting hole 146 is provided on the inner shell 14, and the sound-producing device 3 is mounted within the second mounting hole 146, thereby securing the sound-producing device 3 to the inner shell 14. The position of the second mounting hole 146 corresponds to that of the sound-producing device 3, which can make better outward diffusion of the sound produced by the sound-producing device 3. Specifically, the periphery of the second mounting hole 146 is provided with a second clamping groove 1461. The sound-producing device 3 includes a second connecting part 31, which is configured to engage with the second clamping groove 1461, thereby securing the sound-producing device 3 firmly to the second mounting hole 146. With this structural configuration, the engagement of the second connecting part 31 with the second clamping groove 1461 ensures that the sound-producing device 3 can be stably mounted within the second mounting hole 146.

In this embodiment, a baffle 112 is provided on the inner wall of the upper shell 11, and a fastener 1444 is provided on the inner wall of the atomization chamber 144. The baffle plate 112 is configured to engage with the fastener 1444, causing the baffle 112 to abut against the inner wall of the atomization chamber 144. This arrangement prevents mist within the atomization chamber 144 from diffusing toward the sound-producing device 3. With this structural configuration, when the baffle 112 is engaged with the fastener 1444, the baffle 112 abuts against the inner wall of the atomization chamber 144, and the position of the baffle 112 is between the atomization chamber 144 and the sound-producing device 3, which can block the diffusion of mist in the atomization chamber 144 toward the sound-producing device 3, thereby preventing damage to the sound-producing device 3 due to water ingress.

In this embodiment, the upper shell 11 further includes multiple sound holes 15. The sound holes 15 are positioned correspondingly to the sound-producing device 3, serving to protect the sound-producing device 3. With this structural configuration, the upper shell 11 is equipped with multiple sound holes 15, of which the positions correspond to the position of the sound-producing device 3. These sound holes 15 facilitate the outward diffusion of sound produced by the sound-producing device 3 and can protect the sound-producing device 3.

In this embodiment, the power supply system 4 includes a battery 41, a charging port 42, and a control button 43. The middle shell 12 includes a mounting groove 124, the battery 41 is disposed within the mounting groove 124. The battery 41, the charging port 42, and the control button 43 are electrically connected to the control circuit board 9. The control button 43 is mounted on the housing 1 and is used to operate the floating atomizer light speaker device. The charging port 42 is used to charge the battery 41. The floating atomizer light speaker device further includes a waterproof plug 421, which is fitted over the charging port 42 to enhance sealing performance of the charging port 42. With this structural configuration, the charging port 42 can be a common charging interface such as USB or Type-C, which is convenient for users to charge. The waterproof plug 421 covers the charging port 42 to prevent water from entering the charging port 42 and causing circuit damage The floating atomizer light speaker device has a first atomization mode and a second atomization mode, the power of the atomization assembly 2 in the second atomization mode is higher than that in the first atomization mode. The control button 43 can control the floating atomizer light speaker device to switch between atomization modes and control the sound-producing device 3. The middle shell 12 is provided with the mounting groove 124, in which the battery 41 is mounted. There are four batteries 41, the four batteries can provide more electrical energy to the floating atomizer light speaker device, thereby enhancing its operational endurance.

In this embodiment, the floating atomizer light speaker device further includes a first light-emitting assembly 51. The first light-emitting assembly 51 is disposed in the second accommodation chamber 141, oriented downward, and connected to the middle shell 12. The middle shell 12 further includes multiple first light-transmitting parts 125. The light-emitting positions of the first light-emitting assembly 51 correspond to the positions of the first light-transmitting parts 125. The lower shell 13 is made of transparent material. Light emitted by the first light-emitting assembly 51 passes through the first light-transmitting parts 125 and the lower shell 13 to project into water. With this structural configuration, the first light-emitting assembly 51 is disposed within the second accommodation chamber 141 and fixedly connected to the middle shell 12, and the first light-emitting assembly 51 emits light downward. The middle shell 12 is provided with the multiple first light-transmitting parts 125, and positions of the first light-transmitting parts 125 correspond to that of the first light-emitting assembly 51. Since the lower shell 13 is made of transparent material, the light emitted by the first light-emitting assembly 51 can penetrate through the first light-transmitting parts 125 and the lower shell 13 to project into the water. Preferably, the first light-emitting assembly 51 supports multiple modes such as breathing, flashing, gradient dimming, and constant illumination. The first light-emitting assembly 51 is also capable of emitting light in various colors, providing users with enhanced visual experience.

In this embodiment, the floating atomizer light speaker device further includes a second light-emitting assembly 52. The second light-emitting assembly 52 is arranged inside the atomization chamber 144 and corresponds in position to the spray nozzle 5. The second light-emitting assembly 52 is oriented upward. The floating atomizer light speaker device further includes a second light-transmitting part 1445, which covers the second light-emitting assembly 52. With this structural configuration, the second light-emitting assembly 52 is disposed within the atomization chamber 144 and illuminates upward. The second light-emitting assembly 52 corresponds in position to the spray nozzle 5, then the second light-emitting assembly 52 can illuminate mist emitted from the spray nozzle 5. The second light-transmitting part 1445 is a transparent cover and covers the second light-emitting assembly 52 to protect the second light-emitting assembly 52 and prevent the second light-emitting assembly 52 from being damaged by water ingress. Preferably, the second light-emitting device 52 supports multiple modes such as breathing, flashing, gradient dimming, and constant illumination. The second light-emitting assembly 52 is also capable of emitting light in various colors to illuminate mist emitted from the spray nozzle 5, thereby providing users with enhanced visual experience.

In this embodiment, the control circuit board 9 includes a storage module 92. The storage module 92 is capable of storing settings of the floating atomizer light speaker device prior to shutdown. With this structural configuration, the control circuit board 9 includes a storage module 92, and the storage module 92 can store working modes of the light-emitting assemblies 51 and 52, the atomization assembly 2, and the sound-producing device 3 before shutdown of the floating atomizer light speaker device. Upon restarting, the light-emitting assemblies 51 and 52, the atomization assembly 2, and the sound-producing device 3 can still work according to the settings before shut down, without the need for users to reconfigure, thereby providing convenience to users.

Embodiment 2

Figure 10:
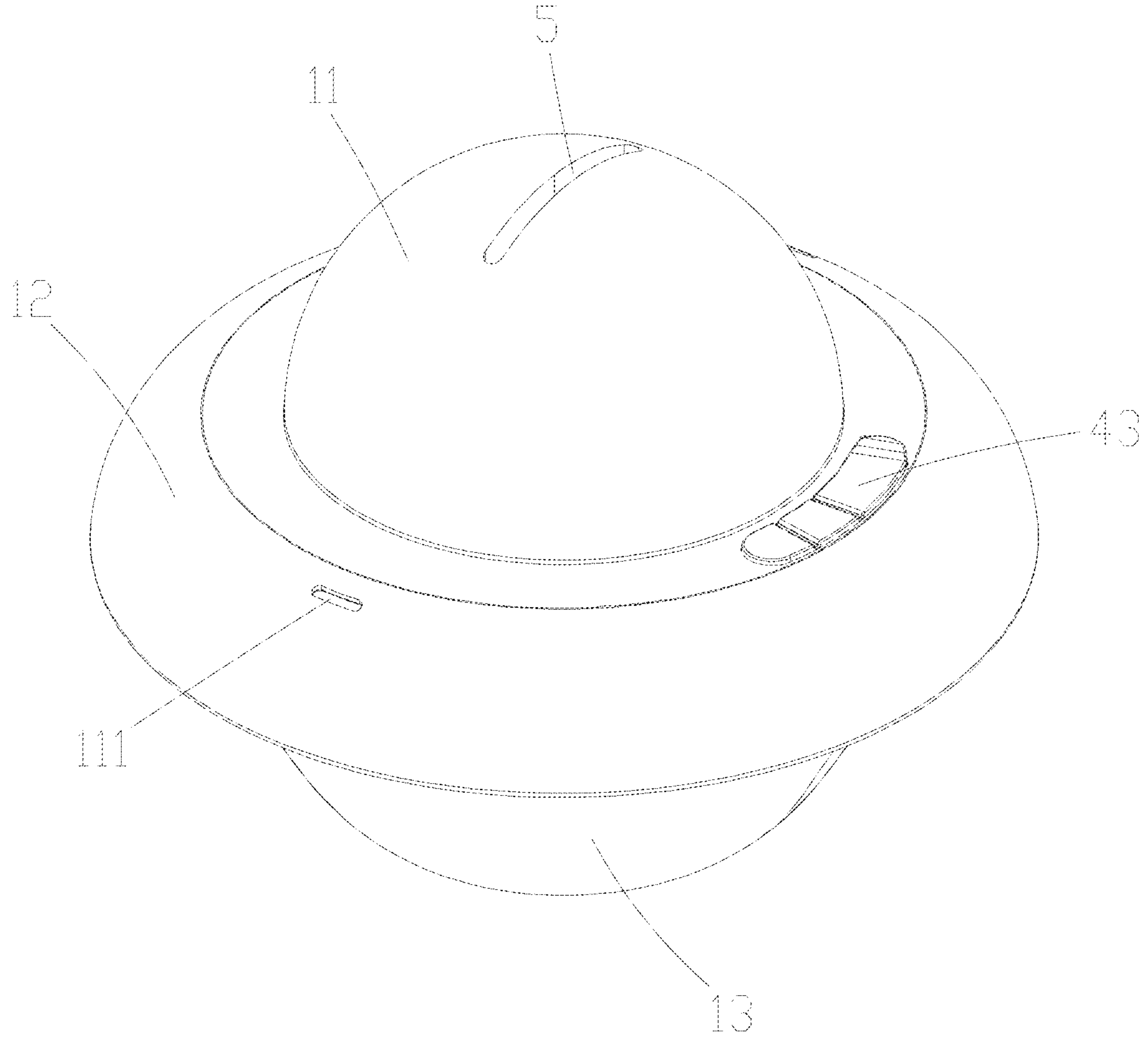
FIG. 10 is a perspective view of Embodiment 2 of the floating atomizer light speaker device of the present application.
Figure 11:
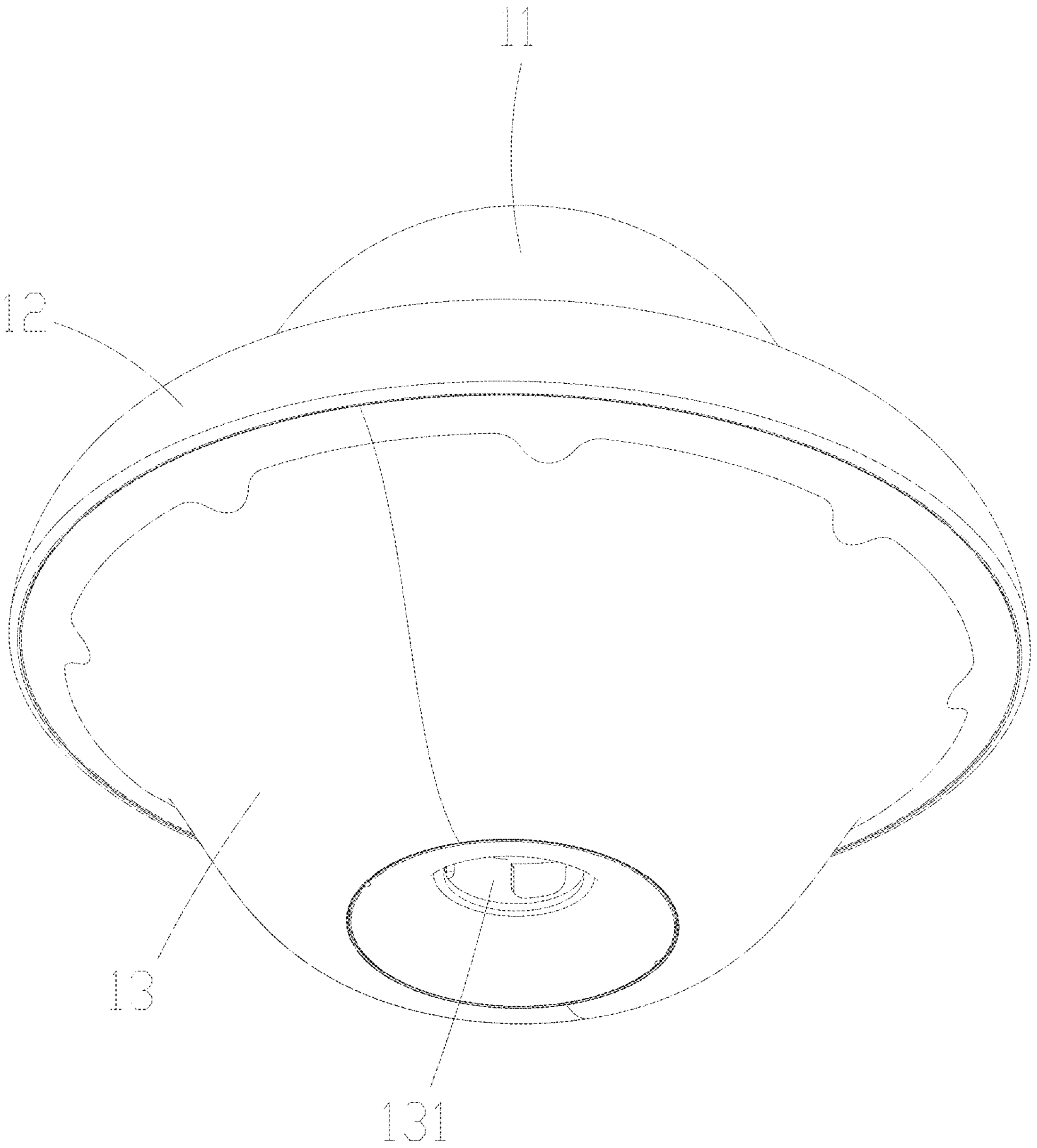
FIG. 11 is another perspective view of Embodiment 2 of the floating atomizer light speaker device of the present application.

Referring to FIG. 10 and FIG. 11, compared with Embodiment 1, Embodiment 2 is not provided with the sound-producing device 3, and the second air inlet 111 is provided on the middle shell 12. Other structures are the same as that of Embodiment 1.

The above description presents one or more embodiments in conjunction with specific details, which are not intended to limit specific implementation of the present application to these examples. Any methods or structures that are similar or equivalent to those of the present application, as well as any technical deductions or substitutions made based on the concept of the present application, shall fall within the scope of protection of the present application.

What is claimed is:

1. A floating atomizer light speaker device, comprising:

a housing configured to float on a water surface and comprising a spray nozzle oriented upward;

an atomization assembly disposed in the housing and configured to convert liquid into mist, wherein the mist discharges through the spray nozzle;

a sound-producing device disposed in the housing and configured to play audio;

a power supply system disposed in the housing and electrically connected to the atomization assembly and the sound-producing device to supply power to the atomization assembly and the sound-producing device; and a control circuit board electrically connected to the power supply system and the sound-producing device, wherein the control circuit board comprises a wireless communication module, and the control circuit board is configured to receive wireless signals via the wireless communication module and control the sound-producing device to play audio based on received wireless signals.

2. The floating atomizer light speaker device according to claim 1, wherein the housing comprises an upper shell, a middle shell, and a lower shell, wherein the lower shell is configured to float on water, and the upper shell, the middle shell, and the lower shell are connected sequentially.

3. The floating atomizer light speaker device according to claim 2, wherein the middle shell and the lower shell are connected to form a first accommodation chamber, the bottom of the lower shell comprises a plurality of first water inlets, the first water inlets are in communication with the first accommodation chamber, and the first water inlets are configured to allow water to flow into the first accommodation chamber.

4. The floating atomizer light speaker device according to claim 2, further comprising an inner shell disposed between the upper shell and the middle shell, wherein the inner shell and the middle shell are connected to form a second accommodation chamber; and the atomization assembly, the sound-producing device, and the power supply system are disposed in the second accommodation chamber.

5. The floating atomizer light speaker device according to claim 4, wherein the inner shell further comprises a first clamping groove, and the middle shell comprises a first connection part, the first connection part is configured to engage with the first clamping groove to connect the inner shell with the middle shell to form the second accommodation chamber.

6. The floating atomizer light speaker device according to claim 5, wherein a first sealing member is disposed in the first clamping groove, and the first connection part is configured to engage with the first clamping groove and compress the first sealing member to enhance the sealing of the second accommodation chamber.

7. The floating atomizer light speaker device according to claim 6, wherein the inner shell comprises an atomization channel, the atomization assembly is disposed in the atomization channel, the middle shell comprises a fixing groove, one end of the atomization channel is inserted in the fixing groove to fixedly connect the atomization channel and the middle shell; a second sealing member is disposed in the fixing groove, and one end of the atomization channel is inserted in the fixing groove and compresses the second sealing member to enhance the sealing of the second accommodation chamber.

8. The floating atomizer light speaker device according to claim 7, wherein the atomization channel comprises a transverse plate, the transverse plate comprises a first mounting hole, and the atomization assembly is inserted in the first mounting hole to fixedly connect the atomization assembly and the middle shell.

9. The floating atomizer light speaker device according to claim 8, wherein the inner shell further comprises an atomization chamber, one end of the atomization assembly is disposed in the atomization chamber, the transverse plate further comprises a second water inlet, the second water inlet is in communication with the atomization chamber, and the second water inlet is configured to allow water to enter the atomization chamber for atomization by the atomization assembly into a mist state.

10. The floating atomizer light speaker device according to claim 9, further comprising a fan electrically connected to the power supply system, wherein a fan housing is disposed in the atomization chamber, the fan housing is connected to the inner shell, and the fan is disposed in the fan housing.

11. The floating atomizer light speaker device according to claim 10, wherein the spray nozzle is in communication with the atomization chamber, the fan housing comprises an air outlet, and the air outlet is inclined toward the inner wall of the atomization chamber to make wind driven by the fan generate a flowing airflow in the atomization chamber to drive mist discharge through the spray nozzle quickly.

12. The floating atomizer light speaker device according to claim 10, wherein the fan housing further comprises a first air inlet, the upper shell comprises a second air inlet, and the second air inlet is positioned corresponding to and in communication with the first air inlet to allow air to enter the fan housing.

13. The floating atomizer light speaker device according to claim 12, wherein the inner shell comprises a second mounting hole, the sound-producing device is disposed in the second mounting hole, and the second mounting hole is configured to allow sound from the sound-producing device to diffuse outward.

14. The floating atomizer light speaker device according to claim 13, wherein a baffle is disposed on the inner wall of the upper shell, a fastener is disposed on the inner wall of the atomization chamber, and the baffle is configured to engage with the fastener to abut against the inner wall of the atomization chamber, thereby preventing mist in the atomization chamber from diffusing toward the sound-producing device.

15. The floating atomizer light speaker device according to claim 13, wherein a second clamping groove is disposed around the periphery of the second mounting hole, the sound-producing device comprises a second connection part, and the second connection part is configured to engage with the second clamping groove to fixedly connect the sound-producing device and the second mounting hole.

16. The floating atomizer light speaker device according to claim 2, wherein the upper shell further comprises a plurality of sound holes, and the sound holes are positioned corresponding to the sound-producing device to protect the sound-producing device.

17. The floating atomizer light speaker device according to claim 2, wherein the power supply system comprises a battery, a charging port, and a control button, the middle shell comprises a mounting groove, the battery is disposed in the mounting groove, the battery, the charging port, and the control button are electrically connected to the control circuit board, the control button is disposed on the housing to control the floating atomizer light speaker device, and the charging port is configured to charge the battery; the floating atomizer light speaker device further comprises a waterproof plug covering the charging port to enhance sealing of the charging port.

18. The floating atomizer light speaker device according to claim 3, further comprising a first light-emitting assembly disposed in the second accommodation chamber, wherein the first light-emitting assembly is oriented downward and connected to the middle shell; the middle shell further comprises a plurality of first light-transmitting parts, the light-emitting position of the first light-emitting assembly corresponds to the positions of the first light-transmitting parts, the lower shell is made of transparent material, and light from the first light-emitting assembly is projected into water through the first light-transmitting parts and the lower shell.

19. The floating atomizer light speaker device according to claim 9, further comprising a second light-emitting assembly disposed in the atomization chamber and corresponding to the position of the spray nozzle, wherein the second light-emitting assembly is oriented upward, the floating atomizer light speaker device further comprises a second light-transmitting part covering the second light-emitting assembly.

20. The floating atomizer light speaker device according to claim 1, wherein the control circuit board comprises a storage module, and the storage module is configured to store settings of the floating atomizer light speaker device before shutdown.

* * * * *